US012639081B2

(12) United States Patent
Wang et al.

(10) Patent No.: US 12,639,081 B2
(45) Date of Patent: May 26, 2026

(54) CONFIGURING SMART HOME APPLICATION SCENES

(71) Applicant: SHENZHEN TCL NEW TECHNOLOGY CO., LTD., Shenzhen (CN)

(72) Inventors: Jiabin Wang, Shenzhen (CN); Yun Zeng, Shenzhen (CN)

(73) Assignee: SHENZHEN TCL NEW TECHNOLOGY CO., LTD., Shenzhen (CN)

( * ) Notice: Subject to any disclaimer, the term of this patent is extended or adjusted under 35 U.S.C. 154(b) by 495 days.

(21) Appl. No.: 18/321,750

(22) Filed: May 22, 2023

(65) Prior Publication Data

US 2023/0289198 A1     Sep. 14, 2023

Related U.S. Application Data

(63) Continuation-in-part of application No. PCT/CN2021/126731, filed on Oct. 27, 2021.

(30) Foreign Application Priority Data

Nov. 23, 2020     (CN) .......................... 202011320283.X

(51) Int. Cl.
*G06F 9/445*          (2018.01)
*G06F 9/455*          (2018.01)
(52) U.S. Cl.
CPC ...... *G06F 9/44505* (2013.01); *G06F 9/45533* (2013.01)

(58) Field of Classification Search
CPC ................................................... G06F 9/44505
USPC ............................................................ 718/1
See application file for complete search history.

(56) References Cited

U.S. PATENT DOCUMENTS

| | | | | |
|---|---|---|---|---|
| 6,791,467 | B1* | 9/2004 | Ben-Ze'ev ............. | G08C 19/28 |
| | | | | 345/169 |
| 11,074,156 | B1* | 7/2021 | Lindblad ............. | G06F 11/3644 |
| 11,095,506 | B1* | 8/2021 | Erblat ................. | H04L 41/5058 |
| 2014/0277805 | A1 | 9/2014 | Browne, Jr. et al. | |

FOREIGN PATENT DOCUMENTS

| | | |
|---|---|---|
| CN | 101594251 A | 12/2009 |
| CN | 104796444 A | 7/2015 |
| CN | 105703979 A | 6/2016 |
| CN | 107450899 A | 12/2017 |
| CN | 109428794 A | 3/2019 |
| CN | 109725541 A | 5/2019 |
| CN | 110851221 A | 2/2020 |

(Continued)

OTHER PUBLICATIONS

Chinese Office Action issued in corresponding Chinese Patent Application No. 202011320283.X dated on Aug. 9, 2024, pp. 1-6.

(Continued)

*Primary Examiner* — Charlie Sun
(74) *Attorney, Agent, or Firm* — PV IP PC; Wei Te Chung

(57)     ABSTRACT
A method of configuring an application scene includes obtaining scene configuration data corresponding to the application scene and scene template data, and generating a scene script corresponding to the application scene based on the scene configuration data and the scene template data to configure the application scene.

17 Claims, 2 Drawing Sheets

Obtaining scene configuration data corresponding to an application scene, and scene template data — S10

Generating a scene script corresponding to the application scene based on the scene configuration data and the scene template data to configure the application scene — S20

(56) References Cited

FOREIGN PATENT DOCUMENTS

| | | | | |
|---|---|---|---|---|
| CN | 110855460 A | | 2/2020 | |
| CN | 111176133 A | | 5/2020 | |
| CN | 111650842 A | * | 9/2020 | ............ G06V 40/16 |
| CN | 111766792 A | | 10/2020 | |

OTHER PUBLICATIONS

European Search Report in European application No. 21893706.8, mailed on Sep. 18, 2024.

Industrial Control Computer, Issue 07; Yin Yanlong; Gao Shouwei; Li Yang; Design of a Smart Home Gateway System Based on OpenWRT; public on Jul. 25, 2017.

Anonymous: "Toggle scenes /light scenarios-Configuration-Home Assistant Community", Mar. 1, 2020(Mar. 1, 2020), Sep. 4, 2024(Sep. 4, 2024), XP093201577.

International Search Report in International application No. PCT/CN2021/126731,mailed on Jan. 24, 2022.

Written Opinion of the International Search Authority in International application No. PCT/CN2021/126731, mailed on Jan. 24, 2022.

* cited by examiner

CONFIGURING SMART HOME APPLICATION SCENES

CROSS-REFERENCE TO RELATED APPLICATIONS

This application is a continuation of International Application No. PCT/CN2021/126731, filed on Oct. 27, 2021, which claims priority to and the benefit of Chinese Patent Application No. 202011320283.X, filed on Nov. 23, 2020. The disclosures of the aforementioned applications are incorporated herein by reference in their entireties.

TECHNICAL FIELD

The present application relates to terminal equipment technologies, and in particular, to configuring of an application scene.

BACKGROUND

With the continuous development of smart home, application scenes of the smart home are continuously increasing, enriching people's life. Generally, the application scenes of the smart home are implemented based on a cloud. For example, scene data is configured on the cloud. When an application scene is triggered, a control instruction is transmitted via the cloud to the smart home for performing an action in response to the application scene. However, for implementing a function of the application scene based on the cloud, the smart home needs to be in a networked state. If the smart home is not connected to an external network, the application scene cannot be implemented, which may cause inconvenience to a user.

SUMMARY

In view of the above, the present application provides a method of configuring an application scene, a storage medium, and an edge gateway.

In a first aspect, an embodiment of the present application provides a method of configuring an application scene, where the method of configuring an application scene is applied to an edge gateway and includes: obtaining scene configuration data and scene template data corresponding to an application scene; and generating a scene script corresponding to the application scene based on the scene configuration data and the scene template data to configure the application scene.

In a second aspect, another embodiment of the present application further provides a non-transitory computer readable storage medium having stored thereon instructions executable by a processor to perform operations including obtaining scene configuration data and scene template data corresponding to an application scene; and generating a scene script corresponding to the application scene based on the scene configuration data and the scene template data to configure the application scene.

In a third aspect, yet another embodiment of the present application further provides an edge gateway, including: a processor; a communication bus implementing connection communication between a memory and the processor; and the memory storing thereon instructions executable by the processor to perform operations including obtaining scene configuration data and scene template data corresponding to an application scene; and generating a scene script corresponding to the application scene based on the scene configuration data and the scene template data to configure the application scene.

DETAILED DESCRIPTION

Figure 1:
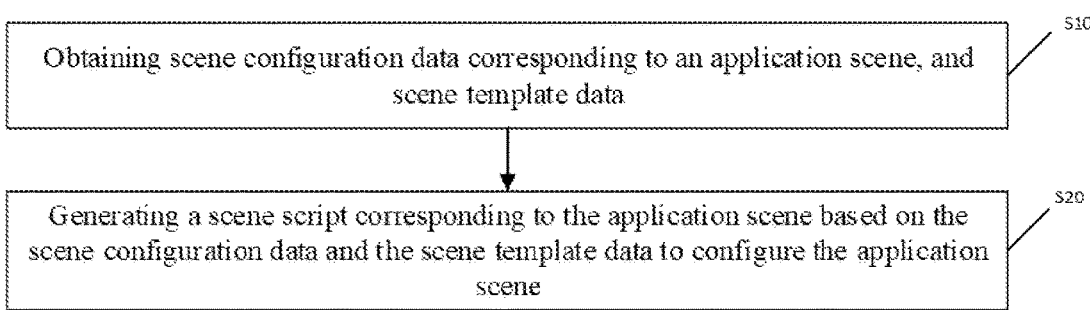
FIG. 1 is a flowchart of a method of configuring an application scene according to an embodiment of the present application.

Some embodiments of the present application will be described in detail below in conjunction with the accompanying drawings. It should be understood that the embodiments described here are only used to explain the present application, and are not intended to limit the present application.

Those skilled in the art can understand that, as used herein, the singular forms "a", "an", "said" and "the" may include the plural forms as well, unless expressly stated otherwise. It should be further understood that the word "comprise" when used in this specification is taken to specify the presence of the features, integers, steps, operations, elements, and/or components, but does not preclude the presence or addition of one or more other features, integers, steps, operations, elements, components, and/or combination thereof. It should be understood that when an element is referred to as being "connected" or "coupled" to another element, it can be directly connected or coupled to the other element or an intervening element may also be present. Furthermore, "connected" or "coupled" as used herein may include wireless connection or wireless coupling. As used herein, the phrase "and/or" includes all or any element and all combinations of one or more of the associated listed items.

Those skilled in the art can understand that, unless otherwise defined, all terms (including technical and scientific terms) used herein have the same meanings as those commonly understood by those of ordinary skill in the art to which the disclosure belongs. It should also be understood that terms, such as those defined in commonly used dictionaries, should be interpreted as having a meaning that is consistent with the meaning of the context of the current technology and will not be interpreted in an idealized or overly formal sense unless defined as here.

Inventors have found that, with the continuous development of the intelligent home, application scenes of the intelligent home are continuously increasing, enriching people's life. An application scene of a current smart home is implemented in following two manners.

In a first manner, a scene table and an automatic table structure of a local gateway database may be configured so as to store scene configuration data transmitted from a cloud into a corresponding database table. When the application scene is triggered, whether a scene triggering condition is met is determined by searching for scene data related to the application scene in the database, and in response to the scene triggering condition being met, an action related to the application scene is executed. In this manner, all scene data may be configured in the database and can be searched for in the database, which may affect a response speed of the application scene.

In a second manner, scene data may be stored on the cloud, and a control instruction may be transmitted to the smart home via the cloud when an application scene is triggered to respond to an execution action corresponding to the application scene. In this manner, the smart home needs to be in a networked state, and while the smart home is not connected to an external network, the application scene cannot be implemented, which causes inconvenience to a user.

In view of the above, in an embodiment of the present application, an application scene is configured on an edge gateway. The edge gateway may obtain scene configuration data and scene template data corresponding to the application scene, and generate a scene script corresponding to the application scene based on the scene configuration data and the scene template data to configure the application scene. After receiving the scene configuration data of the application scene, the embodiment of the present application generates the scene script based on the scene template data and the scene configuration data, so that the application scene can be used as a plug-in of the edge gateway. When the application scene is triggered, the application script can be directly called to execute the application scene. In this way, on the one hand, each application scene may be responded with a scene script corresponding to the application scene, thereby improving response flexibility and a response speed of the application scene. On the other hand, when the target device corresponding to the application scene is not connected to the external network, the application scene can be responded, which brings convenience to the user.

For example, the application scene of the embodiment of the present application may include the cloud and the edge gateway. In the application scene, the cloud can receive a scene configuration request, generate scene configuration data of the application scene based on the scene configuration request, and transmit the scene configuration data to the edge gateway, so that the edge gateway generates a scene script corresponding to the application scene according to the scene configuration data. The edge gateway may receive the scene configuration data transmitted from the cloud, obtain scene template data of the application scene, and generate the scene script corresponding to the application scene based on the scene configuration data and the scene template data, so as to configure the application scene.

It should be noted that the above-described application scene is only shown for ease of understanding of the present application, and the embodiments of the present application are not limited thereto. Rather, embodiments of the present application may be applied to any of scenes where applicable.

The present application will be further explained below through the description of the embodiments in conjunction with the drawings.

The present application provides a method of configuring an application scene that is applied to an edge gateway. The edge gateway may be disposed on a side of a network where a terminal device is located close to the terminal device and located between the terminal device and a cloud. Each of terminal devices in the network where the terminal device is located can be connected to the edge gateway and further connected to the cloud via the edge gateway. In addition, the edge gateway and the terminal device connected thereto are located in the same local area network, and the terminal device can be communicated with the edge gateway when the terminal device is not connected to the external network. The terminal device may be a smart television, a smart washing machine, a smart refrigerator, a smart lamp, or the like.

As shown in FIG. 1, a method of configuring an application scene provided in an embodiment of the present application specifically includes following steps S10-S20.

At step S10, scene configuration data corresponding to an application scene and scene template data are obtained.

The application scene is a use scene of a terminal device connected to an edge gateway. For example, the application scene is a scene in which a living room lamp is automatically turned on when a person is detected. The scene configuration data is data information used for generating the application scene, and may include a triggering condition of the application scene, device information (for example, a device identifier and a device address) of a target device corresponding to the application scene, an execution operation corresponding to the application scene, or the like. The target device may be a terminal device responsive to the application scene, such as, a smart television, a smart washing machine, a smart refrigerator, and/or a smart lamp. The execution operation may be an operation for controlling the response of the target device.

Figure 2:
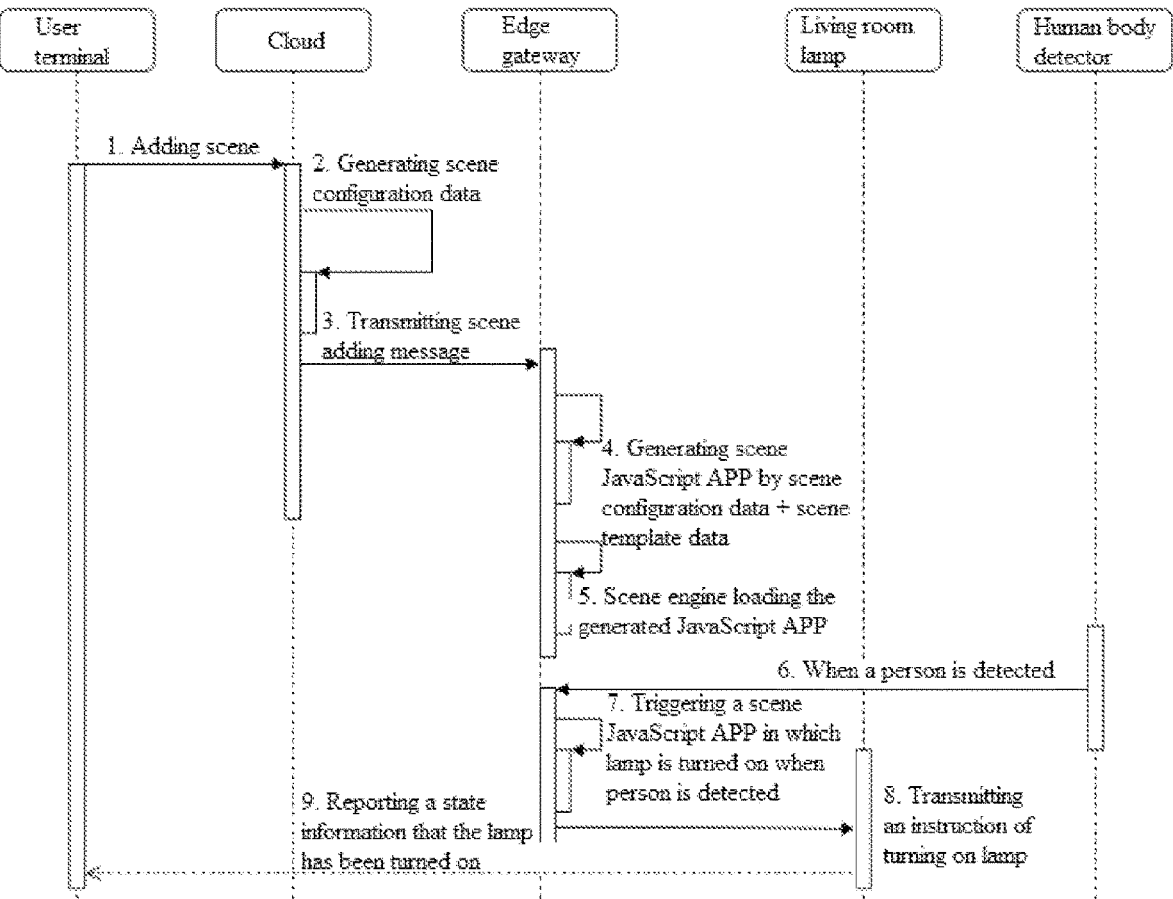
FIG. 2 is a flowchart of configuring an application scene in which a living room lamp is turned on in the presence of someone as an example of the present application.

The scene configuration data may be transmitted by an external device to the edge gateway, may be obtained from the cloud via which the edge gateway is connected, or may be stored locally in the edge gateway. In one implementation of the embodiment of the present application, as shown in FIG. 2, the scene configuration data is obtained from the cloud via the edge gateway. Correspondingly, obtaining the scene configuration data corresponding to the application scene can be specifically implemented by: the edge gateway being connected to the cloud to receive the scene configuration data corresponding to the application scene from the cloud. The scene configuration data may be generated by the cloud based on the received scene configuration request, and the scene configuration request may be formed by a user terminal based on the received scene adding operation. In other words, the user terminal receives the scene adding operation and generates the scene configuration request based on the scene adding operation. The scene configuration request may carry scene information of the application scene. The user terminal may transmit the scene configuration request to the cloud. The cloud may receive the scene configuration request and generate scene configuration data based on the scene configuration request. In this way, the edge gateway can obtain the scene configuration data transmitted from the cloud, and the user can control the edge gateway to configure the scene via the user terminal, thereby improving flexibility of configuring the scene with the edge gateway. In addition, in order for the edge gateway to configure the application scene immediately after obtaining the scene configuration data, the cloud can transmit a scene adding message to the edge gateway to add the scene configuration data into the add scene message, and use the scene adding message as a trigger instruction to trigger the edge gateway to perform scene configuration based on the scene configuration data, so that the edge gateway configures the application scene.

The scene template data may be a scene template for generating the application scene by the edge gateway, and after the scene configuration data is obtained, the scene configuration data can be added into the scene template data to generate the application scene. The scene template data may be pre-stored in the edge gateway. After receiving the scene configuration data, the edge gateway reads the scene template data stored in the edge gateway to obtain template data corresponding to the application scene. The edge gateway may be configured with scene template data, which is general scene template data. Each of application scenes configured by the edge gateway uses the scene template data as respective scene template data corresponding to the application scene. Of course, in a practical application, the edge gateway may be configured with a plurality of pieces of scene template data (where the plurality of pieces of scene template data includes two pieces of scene template data), and scene categories corresponding to the plurality of pieces of scene template data are different from each other. Each of the scene categories may be used to reflect an application scene for which the scene template data corresponding to the scene category is used, and may be determined based on a device type corresponding to the application scene. For example, the scene categories may include a smart refrigerator scene category, a smart lamp scene category, or the like.

In one implementation of an embodiment of the present application, the scene template data may be generated based on three elements of automation. The three elements of automation include a trigger, a condition, and an action. The trigger may be a trigger rule for triggering automation. For example, if the trigger rule is arriving home, configuration information corresponding to the trigger is change of position from "being out" to "arriving home". The condition may be used to limit a validity condition of the trigger rule. For example, if the condition is between 7:00 and 8:00 p.m., the trigger rule takes effect only when the time is between 7:00 and 8:00 p.m. When the trigger rule and the condition are satisfied, an action related to the application scene is performed. For example, if the action is to turn on an entrance lamp, the operation to turn on the entrance lamp is performed when arriving home between 7:00 and 8:00 p.m. is satisfied. Based on this case, the scene configuration data may include the trigger, the condition, and the action. For example, an application scene is a scene in which a living room lamp is automatically turned on when a person is detected between 7:00 and 8:00 p.m., and configuration information includes detecting the person, between 7:00 and 8:00 p.m., and turning on the living room lamp, where the trigger is detecting the person, the condition is between 7:00 and 8:00 p.m., and the action is turning on the living room lamp.

In addition, the scene template data may further include a publishing function and a subscription function. The publishing function may be used to publish an application scenario based on the scene template data, and the subscription function may be used to subscribe the scene template data for the terminal device connected to the edge gateway. Of course, in a practical application, the scene template data may further include a timing function for starting the application scene in a timing manner.

At step S20, a scene script corresponding to the application scene is generated based on the scene configuration data and the scene template data to configure the application scene.

The scene script may be configured to perform the application scene. It should be understood that, when the application scene is triggered, the scene script responds to the triggering to form a control instruction corresponding to the application scene so as to control a target device corresponding to the application scene to perform a corresponding control operation based on the control instruction. In addition, after obtaining the scene script, the scene script is stored in the edge gateway as a scene plug-in. When the application scene is triggered, the scene plug-in can be called to respond to the application scene. As such, each of application scenes can be used as an independent scene plug-in, and can be directly invoked when the application scene is triggered, thereby improving a response speed of the application scene. In one implementation of the embodiment of the present application, the edge gateway may store a plurality of scene scripts, where each of the scene scripts corresponds to an application scene, and the respective application scene corresponding to each of the scene scripts is different. In addition, the scene scripts in the edge gateway may be updated and deleted. The updating the scene script refers to updating scene configuration data in the scene script. For example, if the scene configuration data in the scene script includes a trigger rule being between 7:00 and 8:00 p.m., then the trigger rule may be updated to be between 5:00 and 6:00 p.m. Deleting refers to deleting the scene script. For example, if the edge gateway stores the scene script A and the scene script B, then the edge gateway may delete the scene script A and/or the scene script B.

In one implementation of the embodiment of the present application, the edge gateway is configured with a script virtual machine, and the step of generating the scene script corresponding to the application scene based on the scene configuration data and the scene template data can be specifically implemented by: the script virtual machine generating the scene script corresponding to the application scene based on the scene configuration data and the scene template data.

Specifically, the script virtual machine is a virtual machine for processing a script. After obtaining the scene configuration data, the script virtual machine can automatically generate the scene script based on the scene configuration data and the scene template data. In one implementation of the embodiment of the present application, the script virtual machine may employ a JavaScript engine, which may be used to write JavaScript codes and implement functions of the application scene with the written JavaScript codes. It can be understood that, after the edge gateway obtains the scene configuration data and the scene template data, the JavaScript engine writes the scene configuration data into the scene template data to obtain JavaScript codes as the scene script. In other words, the scene script is JavaScript codes obtained by the JavaScript engine, and the JavaScript codes are configured to implement the functions of the application scene. In addition, the scene script is generated by the edge gateway based on the scene configuration data and the scene template data, and a programming language corresponding to the scene script is the same as a programming language corresponding to the scene template data. Thus, when the scene script is written in the JavaScript language, the scene template data may be a section of program codes written in the JavaScript language, where a plurality of configuration items are configured in the program codes and correspond to the plurality of pieces of configuration data included in the scene configuration data on a one-to-one basis. Accordingly, the process of generating the scene script corresponding to the application scene based on the scene configuration data and the scene template data may be specifically implemented by: configuring each of the pieces of scene configuration data in a configuration item corresponding to the scene configuration data so that the scene template data is configured with the scene configuration data, and the configured scene template data is used as the scene script corresponding to the application scene.

In one implementation of the embodiment of the present application, the script virtual machine is pre-configured in the edge gateway, and before the step of obtain the scene configuration data and the scene template data corresponding to the application scene, the method of configuring an application scene includes: obtaining a generator file corresponding to the script virtual machine and a compiler file corresponding to the edge gateway; and compiling the generator file based on the compiler file to generate the script virtual machine.

Specifically, the generator file includes a source code corresponding to the script virtual machine. For example, the script virtual machine is a JavaScript engine, and the generator file is a source code of the JavaScript engine. The compiler file includes a compilation tool corresponding to the edge gateway through which the edge gateway compiles the generator file to compile the generator file into the script virtual machine. For example, the generator file is the source code of the JavaScript engine, and the compilation tool compiles the source code of the JavaScript engine to obtain the JavaScript engine.

In summary, the embodiment of the present application provides the method of configuring an application scene. The method of configuring an application scene includes obtaining the scene configuration data and the scene template data corresponding to the application scene, and generating the scene script corresponding to the application scene based on the scene configuration data and the scene template data to configure the application scene. After receiving scene configuration data of the application scene, the present application generates the scene script based on the scene template data and the scene configuration data, so that the application scene can be used as a plug-in of the edge gateway. When the application scene is triggered, the application script can be directly called to execute the application scene, so that the application scene can also be responded when a target device corresponding to the application scene is not connected to an external network, which brings convenience to a user.

In one implementation of the embodiment of the present application, after configuring the application scene, the edge gateway receives trigger information for triggering the application scene, and responds to the trigger information to implement a scene function corresponding to the application scene. For example, after the step of generating the scene script corresponding to the application scene based on the scene configuration data and the scene template data to configure the application scene, the method of configuring an application scene may further include: receiving trigger information for triggering the application scene; and responding to the trigger information based on the scene script to control a target device corresponding to the application scene to execute a control operation corresponding to the trigger information.

Specifically, the trigger information is configured to trigger the application scene. The trigger information may be transmitted by an external device to an edge gateway. The trigger information may include a touch rule corresponding to the application scene. In addition, in order to avoid misoperation, when the trigger information is received, the received trigger information may be matched with a trigger rule corresponding to the application scene. When the trigger information matches the trigger rule corresponding to the application scene, a step of responding to the trigger information based on the scene script is performed. When the trigger information does not match the trigger rule corresponding to the application scene, the trigger information is discarded. For example, as shown in FIG. 2, the application scene is turning on the living room lamp when a person is detected, and the trigger information is that a person is detected, where the trigger information may be obtained by a human body detector for detecting a person, and the human body detector is connected to the edge gateway to transmit the trigger information to the edge gateway when a person is detected. The human body detector may be disposed on the living room lamp, or may also be mounted on other devices (e.g., a door, etc.).

Further, responding to the trigger information based on the scene script refers to determining a control operation corresponding to the trigger information based on the scene script, and generating a control instruction corresponding to the control operation. After generating the control instruction, the edge gateway transmits the control instruction to the target device corresponding to the application scene, so that the target device corresponding to the application scene executes the control operation corresponding to the trigger information. For example, if the target device is the living room lamp, then the control operation is on. After the edge gateway receives the trigger information, the scene script can generate a control instruction for turning on the living room lamp based on the trigger information, and transmit the control instruction to the living room lamp so that the living room lamp is turned on in response to the control instruction. In addition, after being turned on based on the instruction of turning on the lamp, the living room lamp may report on state information to the user terminal, so that the user can know a working state of the living room lamp.

Based on the above-described method of configuring an application scene, the present application further provides a non-transitory computer-readable storage medium having stored thereon instructions executable by a processor to perform operations in the method of configuring an application scene in the embodiments described above.

Figure 3:
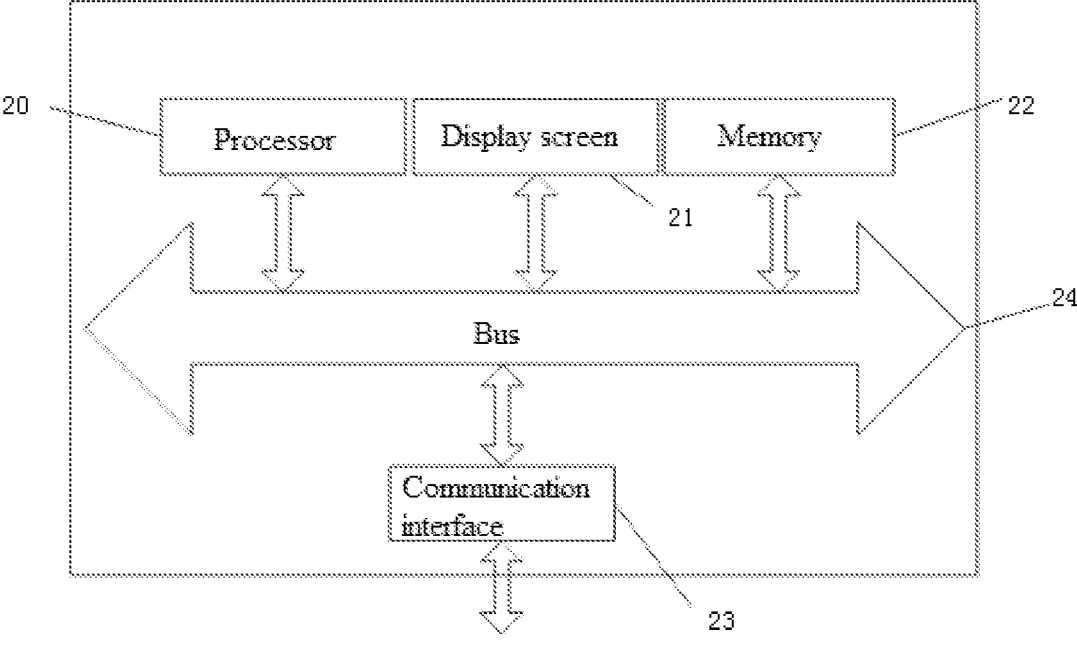
FIG. 3 is a schematic block diagram of an edge gateway according to an embodiment of the present application.

Based on the above-described method of configuring an application scene, the present application further provides an edge gateway. As shown in FIG. 3, the edge gateway may include at least one processor 20; a display screen 21; and a memory 22 and may also include a communications interface 23 and a bus 24. The processor 20, the display 21, the memory 22 and the communications interface 23 may communicate with each other via the bus 24. The communications interface 23 may transmit information. The display screen 21 may be set to display a user guide interface preset in the initial setting mode. The processor 20 may call logical instructions in the memory 22 to perform the method of configuring an application scene in the embodiments described above.

Furthermore, the logic instructions in the memory 22 described above may be implemented in the form of a software functional unit, and stored in a computer-readable storage medium when sold or used as a stand-alone product.

The memory 22, as a non-transitory computer-readable storage medium, may be configured to store software programs, computer-executable programs, program instructions or modules corresponding to the method of configuring an application scene in the embodiments described above. The processor 20 executes the functional applications and the data processing, i.e. implements the method of configuring an application scene in the embodiments described above, by running software programs, instructions or modules stored in the memory 22.

The memory 22 may include a storage program area and a storage data area. The storage program area can store an application program required by an operating system and at least one function. The storage data area may store data or the like created according to the use of the terminal device. In addition, memory 22 may include a high speed random access memory, and may also include a non-volatile memory. For example, a U disk, a removable hard disk, a read-only memory (ROM), a random-access memory (RAM), a magnetic disk, or an optical disk may store program code or may be a transient storage medium.

Furthermore, the specific processes loaded and executed by the above-described storage medium and the multiple instruction processors in the edge gateway have been described in detail in the above-described method and will not be repeatedly set forth herein.

The above embodiments are merely illustrative of the present application and are not intended to limit the present application. Various modifications and variations may occur to those skilled in the art. Any modifications, equivalents, variations, etc. within the spirit and principles of the present application are intended to fall within the scope of the present application.

What is claimed is:

1. A method of configuring an application scene, the method being applicable to an edge gateway and comprising:

obtaining scene configuration data corresponding to the application scene, and scene template data; and generating a scene script corresponding to the application scene based on the scene configuration data and the scene template data, to configure the application scene;

wherein the edge gateway is configured with a script virtual machine; and the generating of the scene script comprises:

the script virtual machine generating the scene script based on the scene configuration data and the scene template data;

before the obtaining of the scene configuration data and the scene template data, obtaining a generator file corresponding to the script virtual machine and a compiler file corresponding to the edge gateway; and compiling the generator file based on the compiler file to generate the script virtual machine.

2. The method of claim 1, wherein the script virtual machine comprises a JavaScript engine.

3. The method of claim 1, wherein the scene template data is generated in a programming language of the script virtual machine.

4. The method of claim 1, wherein the scene configuration data is generated and transmitted to the edge gateway by a cloud upon receiving a scene configuration request.

5. The method of claim 4, wherein the scene configuration request is generated by a user terminal upon receiving a scene adding operation.

6. The method of claim 5, wherein the generating of the scene script comprises:

generating the scene script by adding the scene configuration data into the scene template data.

7. The method of claim 1, wherein the edge gateway is configured with a plurality of preset scene scripts respectively corresponding to a plurality of preset application scenes different from each other.

8. The method of claim 1, further comprising: after generating of the scene script to configure the application scene, upon receiving trigger information for triggering the application scene, responding to the trigger information based on the scene script, to control a target device corresponding to the application scene to perform a control operation corresponding to the trigger information.

9. A non-transitory computer readable storage medium having stored thereon instructions executable by a processor to perform operations comprising:

obtaining scene configuration data corresponding to an application scene, and scene template data; and generating a scene script corresponding to the application scene based on the scene configuration data and the scene template data, to configure the application scene;

wherein the edge gateway is configured with a plurality of preset scene scripts respectively corresponding to a plurality of preset application scenes different from each other.

10. An edge gateway, comprising:

a processor; and a memory communicatively connected with the processor via a communication bus, wherein the memory stores thereon instructions executable by the processor to perform operations comprising:

obtaining scene configuration data corresponding to an application scene, and scene template data; and generating a scene script corresponding to the application scene based on the scene configuration data and the scene template data, to configure the application scene;

wherein the scene configuration data is generated and transmitted to the edge gateway by a cloud upon receiving a scene configuration request.

11. The edge gateway of claim 10, wherein the edge gateway is configured with a script virtual machine; and the generating of the scene script comprises:

the script virtual machine generating the scene script based on the scene configuration data and the scene template data.

12. The edge gateway of claim 11, wherein the script virtual machine comprises a JavaScript engine.

13. The edge gateway of claim 11, wherein the operations further comprise: before the obtaining of the scene configuration data and the scene template data, obtaining a generator file corresponding to the script virtual machine and a compiler file corresponding to the edge gateway; and compiling the generator file based on the compiler file to generate the script virtual machine.

14. The edge gateway of claim 11, wherein the scene template data is generated in a programming language of the script virtual machine.

15. The edge gateway of claim 10, wherein the scene configuration request is generated by a user terminal upon receiving a scene adding operation.

16. The edge gateway of claim 10, wherein the edge gateway is configured with a plurality of preset scene scripts respectively corresponding to a plurality of preset application scenes different from each other.

17. The edge gateway of claim 10, wherein the operations further comprise: after the generating of the scene script to configure the application scene, upon receiving trigger information for triggering the application scene, responding to the trigger information based on the scene script, to control a target device corresponding to the application scene to perform a control operation corresponding to the trigger information.

* * * * *